United States Patent [19]

Demidova et al.

[11] 4,152,498

[45] May 1, 1979

[54] POLYMER COMPOSITION

[76] Inventors: Valentina M. Demidova, ulitsa Tukhachevskogo, 37, kv. 241; Maria F. Utjugova, ulitsa Zamshina, 25, korpus 2, kv. 100; Ekaterina N. Matveeva, ulitsa Vasenko, 3, kv. 30, all of Leningrad; Petr A. Kirpichnikov, ulitsa Chekhova, 6a, kv. 17, Kazan; Natalia A. Mukmeneva, Sibirsky trakt, 7/6, kv. 5, Kazan; Venera K. Kadyrova, ulitsa Voskhod, 5, kv. 34, Kazan, all of U.S.S.R.

[21] Appl. No.: 839,555

[22] Filed: Oct. 5, 1977

[51] Int. Cl.² ................................................. C08K 5/52
[52] U.S. Cl. .................................. 526/2; 260/45.8 R
[58] Field of Search ...................... 526/2, 4, 5, 348.4, 526/348.5; 260/45.75 W, 45.85 B, 45.8 R

[56] References Cited

U.S. PATENT DOCUMENTS

| | | | |
|---|---|---|---|
| 3,238,163 | 3/1966 | O'Neill | 260/45.75 W |
| 3,248,351 | 4/1966 | Ray | 260/45.75 W |
| 3,644,482 | 2/1972 | Dexter | 260/45.85 B |

FOREIGN PATENT DOCUMENTS 1171474 11/1969 United Kingdom.

*Primary Examiner*—Paul R. Michl
*Attorney, Agent, or Firm*—Lackenbach, Lilling & Siegel

[57] ABSTRACT

A polymer composition containing the following components in the hereinbelow-specified amounts, per cent by weight:

| | |
|---|---|
| poly-4-methylpenetene-1 or a copolymer of 4-methylpentene-1 with n-hexene | 99.4 to 99.45 |
| pentaerythritic ester of 4-hydroxy-3,5-ditert . butylphenylpropionic acid | 0.1 to 0.4 |
| 4,4'-dimethyl-6,6'-ditert . butyl-2,2'-methylenebisphenyl ester of α-naphthyl or phenylphosphorous acid | 0.4 to 0.1 |
| an anticorrosion additive | 0.1 to 0.05. |

The polymer composition according to the present invention retains a high melt stability upon processing thereof to articles as well as possesses an increased resilience substantially unchanging during aging, and a high thermal stability. The polymer composition is useful in the medical and food industries, electrical and radio engineering.

3 Claims, No Drawings

POLYMER COMPOSITION

The present invention relates to polymer compositions based on polymers of higher branched α olefins. These compositions are useful in the medical industry for the manufacture of medical machinery and instruments; in the food industry for the manufacture of packages; in the milk-processing industry for the manufacture of pipelines, filters and the like and; in the electro-engineering and radio-engineering industries.

Known in the art are polymer compositions consisting of homo- or copolymers of higher branched α-olefins, an anti-corrosion additive and a stabilizing agent comprising a mixture of pentaerythritic ester of 4-hydroxy-3,5-ditert.butylphenylpropionic acid with a cyclic ester of phosphorous acid such as an ester of pyrocatecholphosphorous acid and 2,6di-tert.butyl-4-methylphenol, ester of pyrocatecholphosphorous acid and 3-methyl-6-tert.butylphenol.

The prior art polymer compositions have sufficiently high stability of a melt in the processing of said compositions to articles (melt index after extrusion is about 10 g/10 minutes; after injection-moulding it is 13.5 g/10 minutes). However, the resilience of polymer compositions based on homopolymers of higher branched α-olefines is insufficient (on the order of 11 kg.cm/cm$^2$) and diminishing during aging. Thermal stability of a polymeric composition based on homo-and copolymers of higher branched α-olefins is also insufficient. Thus, start point of breaking of the polymer composition at 150° C. is 1,100–1,500 hours, whereas at 200° C. it is equal to 10 hours.

It is an object of the present invention to provide a polymer composition based on polymers of higher branched α-olefins which retains a high melt stability in the processing thereof.

It is another object of the present invention to provide a polymer composition which possesses increased resilience.

Still another object of the present invention is to provide a polymeric composition having high thermal stability.

These and other objects of the present invention are accomplished by a polymer composition consisting of poly-4-methylpentene-1 or a copolymer of 4-methylpentene-1 with n-hexane, pentaerythritic ester of 4-hydroxy-3,5-ditert.-butylphenylpropionic acid, a cyclic ester of phosphorous acid and an anticorrosion additive. In accordance with the present invention, as the cyclic ester of phosphorous acid, the composition contains 4,4'-dimethyl-6,6'-ditert.butyl-2,2'-methylene bisphenyl ester of α-naphthyl or phenylphosphorous acid, the components being taken in the following proportions, percent by weight:

| | |
|---|---|
| poly-4-methylpentene-1 or a copolymer of 4-methylpentene-1 with n-hexene | 99.4 to 99.45 |
| pentaerythritic ester of 4-hydroxy-3,5-ditert . butylphenylpropionic acid | 0.1 to 0.4 |
| 4,4'dimethyl-6,6'-ditert . butyl-2,2'-methylenebisphenyl ester of α-naphthylor phenylphosphorous acid | 0.4 to 0.1 |
| anticorrosion additive | 0.1 to 0.05. |

It is advisable to employ a polymeric composition containing the following components, per cent by weight:

| | |
|---|---|
| poly-4-methylpentene-1 or a copolymer of 4-methylpenetene-1 with n-hexene | 99.45 |
| pentaerythritic ester of 4-hydroxy-3,5-ditert . butylphenylpropionic acid | 0.2 |
| 4,4'-dimethyl-6,6'-ditert . butyl-2,2'-methylenebisphenyl ester of α-napht-hylor phenylphosphorous acid | 0.3 |
| anticorrosion additive | 0.05. |

Owing to the presence, in the composition according to the present invention, of a stabilizing additive comprising a mixture of pentaerythritic ester of 4-hydroxy-3,5-ditert.-butylphenylpropionic acid with 4,4'-dimethyl-6,6'-ditert.butyl-2,2'-methylenebisphenyl ester of α-naphthyl- or phenylphosphorous acid, said composition retains a sufficiently high melt stability in the processing thereof into articles (melt index after extrusion is 6.4 g/10 minutes. After injection-moulding it is equal to 7.1 g/10 minutes). It possesses increased resilience (up to 35 kg.cm/cm$^2$) substantially changing during aging and a high thermal stability (thus, the start point of breaking of the polymer composition at the temperature of 150° C. is 2,200 hours; at 200° C. - 38 hours).

High transparency, heat-resistance, physiological harmlessness of the polymeric composition according to the present invention, and its capability of withstanding repeated sterilization enable the use of said composition in the manufacture of medical equipment, sterilizable pipes for the food, e.g. milk, industry, and the like. Owing to high dielectric properties, of the polymer composition according to the present invention within a large range of frequencies and temperatures dimensional stability of articles produced from said composition, the latter may be useful in electrical and radio engineering.

The polymer composition according to the present invention is prepared by intermixing a powder-like polymer with stabilizing and anticorrosion additives, followed by extrusion and granulation. The anticorrosion additive can be made of zinc or calcium stearate, magnesium octaate and the like.

When required, the polymer composition may be incorporated with pigments, fillers, chelating agents, light-stabilizing agents, optical bleaching agents and the like.

Different articles of various shapes and dimensions can be manufactured from the thus-prepared composition by conventional methods (such as injection-moulding, extrusion, compression-moulding).

For a better understanding of the present invention, some specific examples illustrating its embodiments are given hereinbelow. Properties of the polymer compositions prepared in Examples 1 through 7 are given in the Table following the Examples.

EXAMPLE 1

A polymer composition is prepared containing the following components, percent by weight:

| | |
|---|---|
| poly-4-methylpentene-1 | 99.45 |
| pentaerythritic ester of 4-hydroxy-3,5-ditert . butylphenylpropionic acid | 0.4 |
| 4,4'-dimethyl-6,6'-ditert.butyl-2,2'-methylenebisphenyl ester of α-naphthyl-phosphorous acid | 0.1 |
| calcium stearate | 0.05. |

Blending of said components of the polymer composition is performed in a high-speed mixer (1,200 r.p.m.) at the temperature of 20° C. for 10 minutes. Thereafter, the resulting polymer composition is extruded in a one-screw extruder (L/D ratio is 20:1) with a temperature distribution over the extruder zones of 240°–260°–250° C. and then granulated. Bars with the dimensions of 4×5×55 mm and discs with a diameter of 45 mm and thickness of 1 mm are injection moulded from the granules at a temperature of 270° to 280° C. under a pressure of 1,000 kgf/cm$^2$.

Melt index of the composition after extrusion and injection moulding is determined using the procedure of ASTM D-1238 - 70 at a temperature of 260° C. under the load of 5 kg.

Resilience of the polymer composition is determined by the Sharpy method using unnotched bars both prior to aging of the bars and during aging thereof, i.e. after maintaining the bars in an air thermostat at a temperature of 200° C. for 10, 20, 25 and 30 hours respectively.

Thermal stability of the composition is determined by the time of the start point of breaking of injection-moulded discs during their residence in the air thermostat at a temperature of 200° C.

In Examples 2 through 6, preparation of the polymer compositions and samples therefrom as well as tests of the polymer composition properties are conducted following the procedure described in Example 1. Given hereinbelow in Examples 2 to 6 are appropriate polymer compositions.

EXAMPLE 2

A polymer composition contains the following components, percent by weight:

| | |
|---|---|
| poly-4-methylpentene-1 | 99.4 |
| pentaerythritic ester of 4-hydroxy-3,5-ditert . butylphenylpropionic acid | 0.3 |
| 4,4'-dimethyl-6,6'-ditert . butyl-2,2'-methylenebisphenyl ester of α-naphthyl-phosphorous acid | 0.2 |
| zinc stearate | 0.1. |

EXAMPLE 3

A polymer composition is prepared which contains the following components, percent by weight:

| | |
|---|---|
| poly-4-methylpentene-1 | 99.425 |
| pentaerythritic ester of 4-hydroxy-3,5-ditertbutylphenylpropionic acid | 0.2 |
| 4,4'-dimethyl-6,6'-ditert . butyl-2,21-methylenebisphenyl ester of α-naphthylphosphorous acid | 0.3 |
| magnesium octaate | 0.075. |

EXAMPLE 4

A polymer composition is prepared which has the following components, percent by weight:

| | |
|---|---|
| poly-4-methylpentene-1 | 99.45 |
| pentaerythritic ester of 4-hydroxy-3,5-ditert . butylphenylpropionic acid | 0.1 |
| 4,4'-dimethyl-6,6'-ditert . butyl-2,2'-methylenebisphenyl ester of α-naphthylphosphorous acid | 0.4 |
| calcium stearate | 0.05. |

EXAMPLE 5

A polymer composition is prepared which contains the following components, percent by weight:

| | |
|---|---|
| poly-4-methylpentene-1 | 99.4 |
| pentaerythritic ester of 4-hydroxy-3,5-ditert . butylphenylpropionic acid | 0.2 |
| 4,4'-dimethyl-6,6'-ditert . butyl-2,2'-methylenebisphenyl ester of phenyl-phosphorous acid | 0.3 |
| calcium stearate | 0.1. |

EXAMPLE 6

A polymer composition is prepared which contains the following components, percent by weight:

| | |
|---|---|
| copolymer of 4-methylpentene-1 with n-hexene (95:5) | 99.45 |
| pentaerythritic ester of 4-hydroxy-3,5-ditertbutylphenylpropionic acid | 0.2 |
| 4,4'-dimethyl-6,6'-ditert . butyl-2,2'-methylenebisphenyl ester of phenyl-phosphorous acid | 0.3 |
| calcium stearate | 0.05. |

EXAMPLE 7

For the purposes of comparison of properties of the composition of the present invention with those of the prior art polymer composition, the latter is prepared from the following components, percent by weight:

| | |
|---|---|
| poly-4-methylpentene-1 | 99.45 |
| pentaerythritic ester of 4,-hydroxy-3,5-ditert . -butyl-phenylpropionic acid | 0.25 |
| ester of pyrocatecholphosphorous acid and 2,6-ditert . butyl-4-methylphenol | 0.25 |
| calcium stearate | 0.05. |

Preparation of the polymer composition and manufacture of samples therefrom as well as tests of the composition properties are conducted following the procedure described in the foregoing Example 1.

It follows from the Table hereinbelow that with increasing content of a cyclic ester in the polymer composition, resilience of the latter is increased. However, the content of 4,4'-dimethyl-6,6'-ditert-butyl-2,2'-methylenebisphenyl ester of α-naphthyl- or phenyl-phosphorous acid in the polymer composition equal to 0.3% by weight is optimal, the content of pentaerythritic ester of 4-hydroxy-3,5-ditert.butylphenylpropionic acid being equal to 0.2% by weight. In this case, a high thermal stability and a high resilience value of the polymer composition are simultaneously obtained.

Table

| Example No. | Transparency % of passage | Ultimate yield point, kgf/cm$^2$ | Dielectric loss angle at 10$^6$Hz, tgδ × 10$^4$ | Melt index, g/10 min after extrusion | Melt index, g/10 min after injection-mouldind | Time of the breaking start point at 200° C., hours | Resilience, kg$_2$cm/cm$^2$ | Variation of resilience during aging at the temperature of 200° C. and different residence time, kg . cm/cm$^2$ 10 hours | 20 hours | 25 hours | 30 hours |
|---|---|---|---|---|---|---|---|---|---|---|---|
| 1 | 90 | 285 | 2.0 | 8.5 | 12.3 | 34 | 18 | 20 | 22 | 20 | 20 |

Table-continued

| Example No. | Trans- parency % of passage | Ultimate yield point, kgf/cm² | Dielectric loss angle at 10⁶Hz, tgδ × 10⁴ | Melt index, g/10 min after extrusion | Melt index, g/10 min after injection- mouldind | Time of the breaking start point at 200° C., hours | Resilience, kg₂cm/cm² | Variation of resilience during aging at the temperature of 200° C. and different residence time, kg . cm/cm² 10 hours | 20 hours | 25 hours | 30 hours |
|---|---|---|---|---|---|---|---|---|---|---|---|
| 2 | 90 | 285 | 2.0 | 7.5 | 9.75 | 40 | 28 | 28.7 | 30 | 29 | 29 |
| 3 | 92 | 300 | 2.0 | 6.4 | 7.1 | 38 | 32 | 32 | 30.5 | 31 | 30.5 |
| 4 | 91 | 290 | 2.0 | 6.9 | 9.2 | 20 | 35 | 33 | 34 | 35 | 33 |
| 5 | 91 | 295 | 2.0 | 6.5 | 7.1 | 38 | 32 | 32 | 30.5 | 31 | 30.5 |
| 6 | 90 | 240 | 2.0 | 6.7 | 6.8 | 30 | 30 | 31 | 30.5 | 30.5 | 30 |
| 7 | 91 | 270 | 2.0 | 10 | 13.5 | 10 | 11 | 6.6 | 1.6 | sample is broken | sample is broken |

What is claimed is:

1. A polymer composition consisting of (a) polymers of higher branched α olefins, selected from the group consisting of poly-4-methylpentene-1 and a copolymer of 4-methylpentene-1 with n-hexene, (b) pentaerythritic ester of 4-hydroxy-3,5-ditertbutyl-phenylpropionic acid;

(c) 4,4'-dimethyl-6,6'-ditert.butyl2,2'-methylenebisphenylester of phosphorous acid selected from the group consisting of α -naphthylphosphorous and phenylphosphorous acid;

(d) an anticorrosion additive, the components being contained in the following proportions, percent by weight:

| | |
|---|---|
| polymers of higher branched α-olefins | |
| pentaerythritic ester of 4-hydroxy-3,5-ditert.butylphenylpropionic acid | 0.1 to 0.4 |
| 4,4'-dimethyl-6,6'-ditert.butyl-2,2'-methylenebisphenyl ester of phosphorous acid | 0.4 to 0.1 |
| anticorrosion additive | 0.1 to 0.05. |

2. A polymer composition as claimed in claim 1 containing the components in the following amounts, percent by weight:

polymers of higher branched α-olefins; 99.45
pentaerythritic ester of 4-hydroxy-3,5-ditert.-butylphenylpropionic acid; 0.2
4,4'-dimethyl-6,6'-ditert.butyl-2,2'-methylene-bisphenyl ester of phosphorous acid; 0.3
anticorrosion additive 0.05.

3. A polymer composition as claimed in claim 1, containing as the anticorrosion additive a compound selected from the group consisting of calcium stearate, zinc stearate, and magnesium octaate.

* * * * *